Oct. 20, 1942.  A. H. ROSENTHAL  2,299,497
BULB FLASHING DEVICE FOR PHOTOGRAPHIC PURPOSES
Filed March 1, 1941
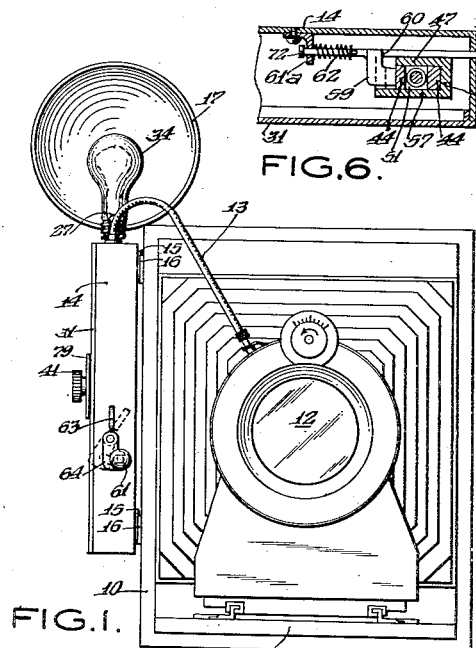
FIG. 1.
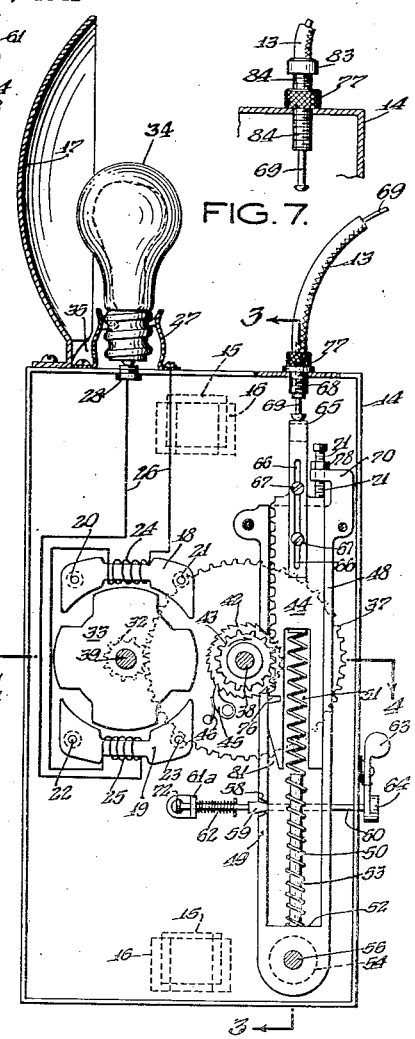
FIG. 6.
FIG. 7.
FIG. 2.
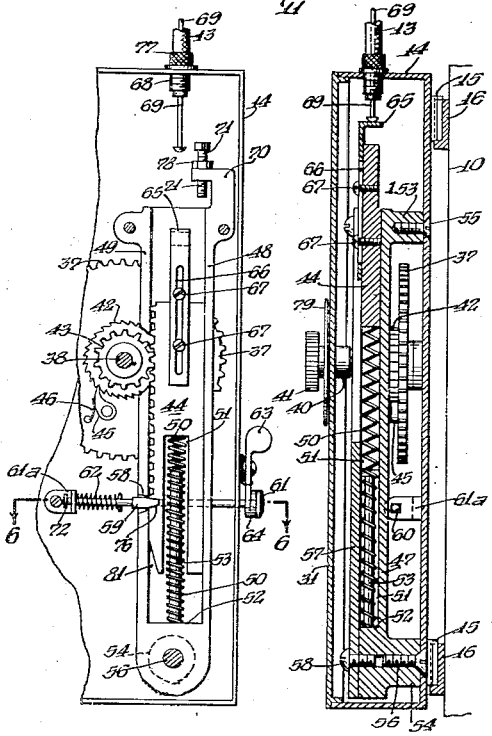
FIG. 5.  FIG. 3.
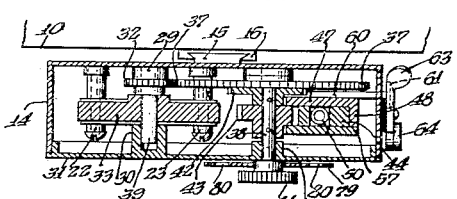
FIG. 4.
INVENTOR
Adolph H. Rosenthal
BY
ATTORNEY Patented Oct. 20, 1942

2,299,497

UNITED STATES PATENT OFFICE 2,299,497

BULB FLASHING DEVICE FOR PHOTOGRAPHIC PURPOSES

Adolph H. Rosenthal, New York, N. Y.

Application March 1, 1941, Serial No. 381,239

2 Claims. (Cl. 67—29)

This invention relates to bulb flashing devices for photographic purposes, particularly of the type in which flashing the bulb is synchronised with actuating the shutter of the camera.

Heretofore devices of this type were provided with an exchangeable battery for flashing the bulb and mechanical or electro-magnetic means for actuating the shutter release in timed relation to flashing the bulb.

Batteries of relatively great capacity were needed for this purpose in order to avoid too fast exhaustion and too frequent replacement. This made the device bulky, and the operator had to pay particular attention to the state of the battery, so as to avoid having a dead battery just when a picture was to be taken.

It is an object of the invention to do away with batteries for the purpose described and to reduce thereby the operation cost.

It is another object of the invention to render the device ready for use at any time, the source of electric energy being provided according to the invention by a generator of the induction-type.

It is another object of the invention to provide a device of the type concerned with a generator of electric energy which is at any time capable to furnish the required energy at particular voltage.

It is still another object of the invention to provide mechanical power means which operate in timed relation the electric generator and the means for actuating the shutter release.

It is still a further object of the invention to adjustably synchronize the means for flashing the bulb and that for actuating the shutter release.

It is still another object of the invention to provide a compact device for the purpose concerned which is simple and inexpensive in manufacture, smooth in operation, requires the least attention of the operator in practical use, and is dependable and efficient.

These and other objects of the invention will be more clearly understood when the specification proceeds with reference to the drawing in which Fig. 1 shows a front view of a camera with a bulb flashing device according to the invention attached thereto, Fig. 2 a cross section through the device with parts in elevation and its movable elements shown in a position in which the shutter release is just being actuated, Fig. 3 a cross section with parts in elevation along line 3—3 in Fig. 2, Fig. 4 a cross section along line 4—4 in Fig. 2, Fig. 5 a fragmentary cross section with parts in elevation similar to Fig. 2 with its movable elements locked in their rest position, Fig. 6 a cross section with parts in elevation along line 6—6 in Fig. 5, and Fig. 7 a modification of the mounting of the cable release.

According to the invention instead of a battery a generator of electric energy is used consisting preferably of a permanent magnet and a magnetizable core advantageously of laminated soft iron provided with one or more coils, the core with coil and the permanent magnet being arranged movable relative to each other and so moved by means of a mechanical source or power, such as a tension or compression spring of any suitable type. Hand operated means are provided for tensioning the spring and thereby storing energy in it, further mechanical means for locking the tensioned spring in its rest position, and other means for releasing the lock and the spring to bring out instantaneous relative movement between the permanent magnet and the core.

Generators of the above type are well known and the permanent magnet and the core may move relative to each other in a straight or curved path; relative rotation of those parts is however preferred.

As it is well known in the art, flashing of the bulb with full intensity of illumination does not occur immediately upon application of the voltage; a certain even though extremely short period is required for heating the igniting filament or member of the bulb and firing the metal filling contained therein. Thus, depending upon the illumination-time characteristic of the bulb as defined above, maximum or peak intensity of illumination occurs shortly after the generator has started to produce electric energy.

According to the invention the mechanical source of power, such as a spring is also used for actuating the release for the camera shutter. It is understood that opening of the shutter must be well timed with respect to that peak intensity of illumination, and therefore the means for actuating the shutter release are arranged preferably adjustably in such a way that the period during which the shutter is open substantially coincides with that peak of illumination.

Referring to Fig. 1, 10 is a casing of a camera with bottom 11 and lens 12. The shutter (not shown) of the camera is actuated in the usual way by a cable release 13. The casing 14 of the device according to the invention is detachably connected with the casing 10 of the camera in any suitable manner, e. g. by means of dovetailed projections 15 on the device and springy shoe clamps 16 on the camera 10, Figs. 1 to 4. A reflector 17 is mounted on the device behind a photo flashbulb 34.

Referring to Figs. 2 and 4, the generator of electric energy consists of two cores 18, 19 of preferably laminated soft iron each mounted by a pair of bolts 20, 21 and 22, 23 on a support, e. g., formed by the rear part of casing 14. Each core comprises pole shoes on both ends and a middle portion around which a coil each 24, 25 is arranged. The coils may be arranged in series or parallel, depending on the voltage desired. In the exemplification of the drawing the coils are shown in series and connected by conductors 26 with a springy terminal 27 on top of casing 14 and a center contact or terminal 28 insulatingly mounted on top of casing 14.

An axle 29 is mounted on the same support as the cores, e. g., formed by the rear part of casing 14 and engages a sleeve 30 provided on an opposite support, e. g., formed by cover 31 of the casing 14. A toothed gear 32 and a permanent magnet 33 are rotatably mounted on axle 29 and rigidly connected with one another. Permanent magnet 33 is provided with four projecting equidistant poles of different polarity so that diametrically opposite poles are of equal polarity. It will be appreciated that upon rotating magnet 33 in any direction, a varying magnetic flux will be induced in the cores 18, 19 which in turn produces a voltage in coils 24, 25 and causes a current to flow through conductors 26, terminals 27, 28 and the igniting member of the flash bulb 34 the socket of which is pressed or screwed between the springy terminal 27 and another springy holder 35 on top of casing 14.

In order to bring about speedy rotation of permanent magnet 33, a gear 37, Figs. 2 to 5, is journaled on a shaft 38 which on one end is rotatably mounted at 39 on the same support as axle 29, i. e., the rear of casing 14 while its other end passes at 40 through cover 31 and is provided with a winding knob 41 outside that cover. A ratchet 42 is fastened to shaft 38, and so is gear 43 which meshes with the toothed edge of rack 44. A pawl 45 is pivotally mounted on gear 37 and pressed by spring 46 into ratchet 42. Rack 44 is slidably arranged in a guide member of U-shaped horizontal cross section and therefore consists of a flat rear portion 47 and lateral flanges 48, 49. In order to move rack 44 from its lowermost rest position, Figs. 4 and 5, into its uppermost position, Fig. 2, a spring is arranged between the rack and its guiding member tending to bring about a swift motion of the rack. In the exemplification of the invention as illustrated, rack 44 is forked at its lower end and one end of a compression spring 50 arranged within and abutting against the upper end of the furcated part 51 of rack 44. The other end of spring 50 abuts against the lower end 52 of the guide member 47 and is coiled around a pin 53 long enough to prevent sideward bending of the spring coil.

The rear part 47 of the guide member is provided with lug-like projections 153, 54 into which screws 55, 56 are threaded from the rear of casing 14. A cover plate 57 covers part of the front side of the space between flanges 48, 49 as to be seen particularly in Fig. 3 and is held in position by another screw 58 entering the hole in lug 54.

Flange 49 is provided with an opening of sufficient size to permit gear 43 to engage the toothed edge of rack 44.

Flange 49 is also provided with another opening 58 through which a stop 59, Figs. 2, 5 and 6, can engage a recess 76 of rack 44. Detent 59 is mounted on and preferably integral with rod 60 slidably arranged in a bracket 61a mounted on a support such as the rear of casing 14, passes through an opening on the side of casing 14 and is there provided with a knob 61. A compression spring 62 tends to press rod 60 and thereby stop 59 into recess 76. A trip 63 is rotatably mounted on a sidewall of casing 14 and provided with an arm 64 which when swung under knob 61 in its projected position as shown in Figs. 5, 6, locks knob 61 and thereby rack 44 in its lowermost rest position in which spring 50 is tensioned. Thereby any unintentional actuation of knob 61 is prevented.

On the top end of rack 44 an abutment 65 is adjustably mounted by means of slit and bolt connections 66, 67. Any conventional means can be provided for operating the shutter of the camera by the abutment 65. In the exemplification of the invention shown, a cable release 13 is used for this purpose, and the end of the cable pressed into a hollow screw 68 provided with a knurled end 77 whereby screw 68 can be screwed into the top wall of casing 14. The end of the cable 69 of the cable release projects in the closed position of the shutter into the space within casing 14 and in the path of abutment 65 as far as shown in Fig. 5. Rack 44 when released, is swiftly moved upwardly by spring 50 and abutment 65 strikes the end of core 69 whereby the latter is driven in the position shown in Fig. 2 where the shutter of the camera is being released; the latter will be closed thereafter conveniently by automatic means set accordingly. It will be appreciated that by setting abutment 65 in any desired position relative to rack 44 by means of the slit-screw connection 66, 67, the abutment will strike and actuate core 69 and thereby open the shutter at any desired moment during the upward motion of rack 44; thus the moment of opening the shutter can be timed relative to the flashing of bulb 34 so that the shutter is open when the peak of illumination by the flashed bulb is reached.

Flange 48 is provided with a projecting arm 70 into which an adjustable stub or set screw 71 is threaded and secured by lock screw 78 in a set position for limiting the upward motion of the rack. In order to absorb the shock when rack 44 strikes the end of stub 71 the latter may be provided with a rubber cushion or the like (not shown).

The device operates in the following manner.

In order to wind the mechanism and to store driving energy, knob 41 is turned in clockwise direction. Thereby shaft 38, gear 43, and ratchet 33 are rotated in the direction of the arrow shown in Fig. 2 without taking along gear 37. Gear 43 engaging the toothed edge of rack 44 moves the latter downwardly and thus compresses spring 50 until recess 76 of rack 44 arrives in front of stop 59 (Fig. 5) and the latter is pressed into that groove by spring 62, thereby locking rack 44 and the tensioned spring 50 in their rest position.

In order to prevent unintentional actuation of knob 61, arm 64 of trip 63 may now be swung into the position shown in full lines in Figs. 1, 5 and 6, locking knob 61 in its projected position.

Although the projected position of knob 61 indicates to the operator that the device is ready to work, there may also be provided another visual indication, such as a circular disc 79 behind and connected with knob 41, Figs. 1 and 4, provided with openings 80. Since knob 41 has to be rotated for less than a complete turn in order to wind the mechanism shown and to tension spring 50, one of the openings 80 may be in front of a green spot on cover 31 when the mechanism is wound, while the same or another opening 80 is in front of a red spot when the mechanism is unwound; of course, other visually indicating colors or means may be chosen.

In order to move stop 59 smoothly to the left when rack 44 is moved downwardly for winding the mechanism, the lower end 81 of the rack is wedge shaped.

In order to flash a new bulb pushed into position between terminal 27 and holder 35, trip 63 is first to be swung into the position shown in dotted lines in Fig. 1 wherein arm 64 is moved out of the path of knob 61. The shutter of the camera is to be tensioned so that the camera is ready for operation, and thereafter knob 61 be pushed inwardly whereby stop 59 is moved out of engagement with recess 76 and rack 44 is released. Rack 44 upon its upward movement under the action of tensioned spring 50 rotates gear 43 in the opposite direction of the arrow in Fig. 2, gear 43 takes along ratchet 42 and, through pawl 45, gear 37 which in turn rotates at a great desired speed gear 32 and permanent magnet 33. Thereby a voltage is induced in coils 24 which eventually flashes the bulb.

As soon as or just before the peak of illumination by the flashing bulb is reached, the properly set abutment 65 strikes the end of cable 69 and pushes the latter upwardly so as to operate the shutter of the camera. Soon thereafter the upper end of rack 44 contacts stop 71 and is stopped (Figs. 2, 3). The shutter closes automatically soon thereafter, or is closed manually. Due to the uni-directional action of the pawl-ratchet connection 42, 45 between the drive of magnet 33 and rack 44, magnet 33 can continue its rotation, slows down and stops after rack 44 has been stopped whereby shocks are avoided.

It should be appreciated that the invention is not confined to the exemplifications shown, but is capable of many modifications within the scope of the appended claims.

Thus a cable 13 of the shutter release, Fig. 7, can be provided with a screw-threaded sleeve 84, secured at 83 to cable 13. Lock nut 77 serves to fix sleeve 84 in the desired screwed in position. Thereby timing of the moment of releasing the shutter can be attained in the same way as explained above with respect to the screwed end 68 of cable 13 in Figs. 2, 3 and 5.

Furthermore, instead of a straight spring for actuating the rack also a spiral spring could be wound around shaft 38 tending to drive gear 43 in counter-clockwise direction which, upon release of the rack, revolves gear 43 and thereby takes along gear 37 as well as rack 44. Furthermore, pawl 45 can also cooperate with gear 43 and ratchet 42 be omitted.

What I claim is:

1. In a bulb flashing device for photographic purposes, an induction-type generator for producing an electric current impulse for flashing a photo-flash-bulb, said generator comprising a stationary induction coil and a permanent magnet rotor, contacts accessible from the outside for exchangeably holding a photo-flash-bulb and electrically connected with said coil, a member slidably arranged in a straight path and provided with an adjustable abutment on one end, said member having a rest position and an operative position in which said abutment is capable of actuating a camera-shutter release, a step-up gear operatively connected with said slidable member and said rotor so as to translate the sliding motion of said member from its resting position to its operative position into almost instantaneous rotation of said rotor at a high rate of angular velocity for a plurality of revolutions, a spring associated with said member so as to be tensioned in said resting position of said member and tending to move the latter to its operative position, manually operable means for restoring said member to its rest position and thereby tensioning said spring, means for locking said member in said rest position, and manually operable means for releasing said locking means so that said member and thereby said rotor are driven simultaneously by said tensioned spring, and said generator produces an electric impulse for flashing a bulb and the adjusted abutment of said member actuates a camera-shutter release in predetermined timed relation thereto.

2. In a bulb flashing device for photographic purposes, an induction-type generator for producing an electric current impulse for flashing a photo-flash-bulb, said generator comprising a stationary soft-iron core and an induction coil on it and a permanent magnet rotor, contacts accessible from the outside for exchangeably holding a photo-flash-bulb and electrically connected with said coil, a member slidably arranged in a guiding path, said member having a rest position and another operative position adjusted for actuating a camera-shutter release, a step-up gear operatively connected with said member and said rotor so as to rotate said rotor almost instantaneously for a plurality of revolutions at a high rate of angular velocity and produce an electric induction current, a spring associated with said member so as to be tensioned in said resting position of said member and tending to move the latter to its operative position, manually operable means for restoring said member to its rest position and thereby tensioning said spring, manually operable means for locking said member in said rest position and thereby said spring in its tensioned state and for releasing said member whereupon said member and thereby said rotor are driven simultaneously by said tensioned spring so that said generator produces an electric impulse for flashing a bulb and said member is moved into its said operative position where it can actuate a camera-shutter release in predetermined timed relation to said flash.

ADOLPH H. ROSENTHAL.